(12) United States Patent
Smith

(10) Patent No.: US 7,013,642 B2
(45) Date of Patent: Mar. 21, 2006

(54) CLUTCH BLEEDER TOOL APPARATUS AND METHOD

(76) Inventor: Frederick Riley Smith, 14 Hilltop Dr., Taylors, SC (US) 29687

( * ) Notice: Subject to any disclaimer, the term of this patent is extended or adjusted under 35 U.S.C. 154(b) by 103 days.

(21) Appl. No.: 10/872,564

(22) Filed: Jun. 21, 2004

(65) Prior Publication Data

US 2005/0279091 A1    Dec. 22, 2005

(51) Int. Cl.
F15B 7/10    (2006.01)
(52) U.S. Cl. .......................................... 60/584; 60/453
(58) Field of Classification Search ................ 60/584, 60/453; 188/352
See application file for complete search history.

(56) References Cited

U.S. PATENT DOCUMENTS

| | | | | |
|---|---|---|---|---|
| 2,670,874 A | * | 3/1954 | Wilkerson | 188/352 |
| 3,455,349 A | * | 7/1969 | Farnfield et al. | 188/352 |
| 4,170,280 A | * | 10/1979 | Schwarz | 60/584 |
| 4,418,803 A | | 12/1983 | Chichester | |
| 4,497,176 A | | 2/1985 | Rubin et al. | |
| 4,842,107 A | * | 6/1989 | Buchanan et al. | 60/584 |
| 5,410,881 A | * | 5/1995 | Ellis | 60/584 |
| 5,806,562 A | * | 9/1998 | Park | 188/352 |
| 5,899,065 A | * | 5/1999 | Petty | 60/584 |
| 5,967,199 A | * | 10/1999 | Riddiford et al. | 188/352 |
| 6,212,888 B1 | | 4/2001 | Nix et al. | |

OTHER PUBLICATIONS

"Ford Ranger & Bronco II Automotive Repair Manual" Alan Ahlstrand, Homer Eubanks and John Haynes, Haynes North America, Inc., Newbury Park, California.
"Ford Pick-ups & Bronco Automotive Repair Manual", Mark Christman, John B. Raffa and John H. Haynes, Haynes North America, Inc. Newbury Park, California, pp. 8-7 thru 8-10.
"Chilton's Ford Pick-ups and Bronco 1987-1996 Repair Manual", Jaffer A. Ahmad, Haynes North America, Inc., Newbury Park, California, pp. 7-11 thru 7-14.

* cited by examiner

Primary Examiner—Edward K. Look
Assistant Examiner—Igor Kershteyn
(74) Attorney, Agent, or Firm—Robert R. Reed; Patent Consultants & Services, Inc.

(57) ABSTRACT

The present invention provides a clutch bleeder tool assembly to force air bubbles from a clutch hydraulic control assembly of a standard vehicle transmission. The clutch bleeder tool assembly includes an adaptor cap to replace the factory cap on the hydraulic fluid reservoir of the clutch assembly. The adaptor cap has a hose attached at one end to the adaptor cap. The other end of the hose is attached to a bulb pump having a check valve. When the bulb pump is operated a positive pressure is maintained in the fluid reservoir. The hydraulically closed clutch hydraulic control assembly is opened at the slave cylinder to allow air bubbles to be forced out, so that proper operation of the clutch hydraulic control assembly is maintained when the hydraulic fluid reservoir is filled and the factory cap is reinstalled.

14 Claims, 5 Drawing Sheets

CLUTCH BLEEDER TOOL APPARATUS AND METHOD

BACKGROUND OF THE INVENTION

This invention is directed to clutch and drive train systems for vehicles and more particularly to a bleeding tool and method to remove entrapped air from the clutch hydraulic control assembly of a clutch type transmission.

A closed hydraulic system depends on a continuous flow of a hydraulic fluid to operate properly. Any air trapped in the system will cause the different components to not transmit the correct hydraulic pressures from place to place in the system. The air becomes a compressible fluid where the hydraulic fluid is incompressible. The clutch hydraulic control assembly of a vehicle can get air trapped in the system from time to time. The general use of hydraulic cylinders to transmit fluid pressures into movements of a push rod are components that can allow air into the fluid system. The seals around the push rods become worn and leak. The clutch hydraulic control assembly generally includes a hydraulic fluid reservoir. If the fluid level in this reservoir is not maintained above a certain level, air is again introduced into the assembly. Components are generally connected by hydraulic lines which can develop a leak in the line or in the connections between the lines and the components they interconnect.

Generally speaking, to remove air trapped in a closed hydraulic system is a difficult task. Air bubbles and pockets of air in the closed hydraulic system are difficult to remove. The clutch hydraulic control assembly of a vehicle is no exception. The removal procedure is similar to bleeding a brake system, but depends on gravity for the bleeding effect. Repair manuals supplied by the manufacturers generally state that "the hydraulic system should be bled to remove all air whenever air enters the system". Manuals further state "this occurs when any part of the system has been moved or if the fluid level has been allowed to fall so low that air has been drawn into the master cylinder". Typical repair manuals are the "Ford Pick-ups & Bronco Automotive Repair Manual" and the "Ford Ranger and Bronco II Automotive Repair Manual" published by Haines North America, Inc., 861 Lawrence drive, Newbury Park, Calif. 91320. Chapter eight of these manuals discuss the clutch and driveline including the bleeding of the clutch hydraulic system. This bleeding information (page 8–9) is a part of this background disclosure and is included herein by reference thereto. Illustrations of typical clutch hydraulic control assemblies of this invention are taken from the Ford Repair Manuals and used herein.

The degree of difficulty in bleeding a clutch hydraulic control assembly can be illustrated by an example taken from the Ford Repair Manual. For example, the manual states that the clutch pedal should be depressed to the floor, held for a couple of seconds, released as rapidly as possible and paused for a couple of seconds before repeating this procedure ten times. This is followed by checking the level in the reservoir and the entire operation (ten times) is repeated five or six times before an assistant releases a bleed screw to expel additional air before tightening the bleed screw and releasing the clutch pedal. This procedure is very time consuming and requires a second mechanic to assist in the bleeding operation without any assurance that the procedure will be successful.

A need exists to have a tool and method to assist the auto mechanic in bleeding a clutch hydraulic control assembly. The removal of air from a hydraulic system is critical for the proper operation of the system. The clutch of the vehicle transmission is properly disengaged if the push rod of the slave cylinder is moved a proper distance. With air in the assembly the clutch pedal may be pushed to the floor without disengaging the clutch. Bleeding of the clutch hydraulic control assembly should not be by chance but should provide a more positive and easier method that a single mechanic can use without the aid of an assistant.

Accordingly, an object of the present invention is to provide a bleeder tool apparatus and method that is easy to use and removes air from the clutch hydraulic control assembly of a vehicle.

Another object of the present invention is to provide a clutch bleeder tool assembly that provides a hydraulic pressure to help remove air from the clutch hydraulic control assembly.

A further object of the invention is to provide a clutch bleeder tool assembly that can be easily connected to the clutch hydraulic control assembly and operated by one mechanic.

Yet another object of the present invention is to provide a cost effective clutch bleeder tool assembly that can be used by a vehicle owner to remove air from a clutch hydraulic control assembly.

SUMMARY OF THE INVENTION

The above objectives are accomplished according to the present invention by providing a clutch bleeder tool assembly to use with the clutch hydraulic control assembly of the vehicle transmission. The clutch bleeder tool assembly applies a pressure to force the air entrapped air from the clutch hydraulic control assembly.

In one embodiment of the invention, a method is provided for bleeding air from a clutch hydraulic control assembly of a vehicle transmission. The clutch hydraulic control assembly has a hydraulic fluid reservoir with a factory cap and a diaphragm, an upper hydraulic line, a lower hydraulic line with a lower end, a master cylinder and a slave cylinder. The method includes the first step of repairing any leaks in the clutch hydraulic control assembly. A second step includes removing the factory cap and diaphragm from the hydraulic fluid reservoir. In a third step the method includes filling the upper and lower hydraulic lines, the master cylinder and the slave cylinder with a hydraulic fluid, if necessary; A fourth step includes filling the hydraulic fluid reservoir with the hydraulic fluid to about 0.5 inch from the top. The fifth step is providing a clutch and bleeder tool assembly, including an air hose connected at one end, to an adaptor cap and at the other end to a bulb pump with a check valve. The sixth step includes connecting the bleeder tool assembly to the clutch hydraulic control assembly by firmly installing the adaptor cap on the hydraulic fluid reservoir. In a seventh step the method includes preparing the clutch hydraulic control assembly to receive the hydraulic fluid. The eighth step includes pumping the bulb pump on the bleeder tool assembly about three times to pressurize the clutch hydraulic control assembly for purging air from the clutch hydraulic control assembly. In a ninth step the method includes removing the adaptor cap from the hydraulic fluid reservoir and refilling the hydraulic fluid reservoir to the top. A tenth step includes repeating steps eight and nine until all air is purged from the clutch hydraulic control assembly. In an eleventh step the method includes replacing the adaptor cap with the factory cap on the hydraulic fluid reservoir. The twelve and final step includes checking the clutch hydraulic control assembly for proper operation and returning to the sixth step, if necessary.

In one aspect of the method of this invention the slave cylinder is an external slave cylinder and the third step of filling the slave cylinder with the hydraulic fluid includes the steps of: removing the external slave cylinder from the vehicle transmission and detaching the lower hydraulic line from the external slave cylinder; plugging the lower end of the lower hydraulic line to prevent hydraulic fluid loss from the lower hydraulic line; holding the external slave cylinder so that the external slave cylinder can be filled with the hydraulic fluid; and pushing on the filled external slave cylinder to expel any air trapped in the external slave cylinder.

In another aspect of the method of this invention the slave cylinder is a concentric slave cylinder with a bleeder valve and the seventh step of preparing the clutch hydraulic control assembly includes opening the bleeder valve of the concentric slave cylinder.

In another embodiment of the invention a clutch bleeder tool assembly is used in combination with a clutch hydraulic control assembly of a clutch type vehicle transmission. The combination tool and control assemblies comprise a hydraulic fluid reservoir of the control assembly attached to a firewall and having a factory cap. The hydraulic fluid reservoir contains a hydraulic fluid for hydraulically operating the control assembly. A master cylinder of the control assembly is operated by a clutch pedal and clutch arm to receive and discharge the hydraulic fluid. An upper hydraulic line of the control assembly extends between and is connected to the hydraulic fluid reservoir and the master cylinder to supply the master cylinder with hydraulic fluid. A slave cylinder of the control assembly is for operating the clutch type vehicle transmission. A lower hydraulic line of the control assembly extends from, and is connected between, the master cylinder and the slave cylinder so that supplying hydraulic fluid to, and removing said hydraulic fluid from, the slave cylinder occurs when the clutch pedal is depressed or relaxed respectfully. An adaptor-cap of the tool assembly has a hose connector and the adaptor cap is used to replace the factory cap on the hydraulic fluid reservoir for bleeding the control assembly of air. A handheld bulb pump with a check valve of the tool assembly is used for pumping air in one direction through the bulb pump. A hose of the tool assembly is connected between the adaptor cap and the bulb pump. The bulb pump is operated to pressurize the control assembly and purge any air bubbles from the clutch hydraulic control assembly.

In one aspect of the combination tool and control assemblies the slave cylinder is an external slave cylinder having a port connection and a connector port for receiving and connecting the lower hydraulic line to the external slave cylinder. The lower hydraulic line is removed from the external slave cylinder at the connector port for filling the external slave cylinder with hydraulic fluid. Bleeding of the remaining control assembly is realized when the bulb pump is operated.

In one aspect of the combination tool and control assemblies the slave cylinder is a concentric slave cylinder having a bleeder valve and bleed screw. The bleed screw is operated for bleeding the clutch hydraulic control assembly of air when said bulb pump is operated.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3A is a cross sectional view of the hose of the clutch bleeder tool assembly taken along line A—A in FIG. 3;

DESCRIPTION OF A PREFERRED EMBODIMENT

Referring now in more detail to the drawings, the invention will now be described in more detail. A clutch bleeder tool assembly of this invention provides a means to force air bubbles from a clutch hydraulic control assembly of a standard vehicle transmission. A closed hydraulic assembly will not operate properly unless all the entrapped air is removed. The clutch bleeder tool assembly includes an adaptor cap to replace the factory cap on the hydraulic fluid reservoir of the clutch assembly. The adaptor cap has one end of a hose attached to the adaptor cap. The other end of the hose is attached to a bulb pump having a check valve. When the bulb pump is operated a pressure is maintained in the fluid reservoir. The clutch hydraulic control assembly terminates at a slave cylinder that operates the clutch of the transmission. The closed hydraulic assembly is opened at the slave cylinder to allow air bubbles to be forced out so that proper operation of the clutch hydraulic control assembly is maintained when the hydraulic fluid reservoir is filled and the factory cap is reinstalled.

Figure 1:
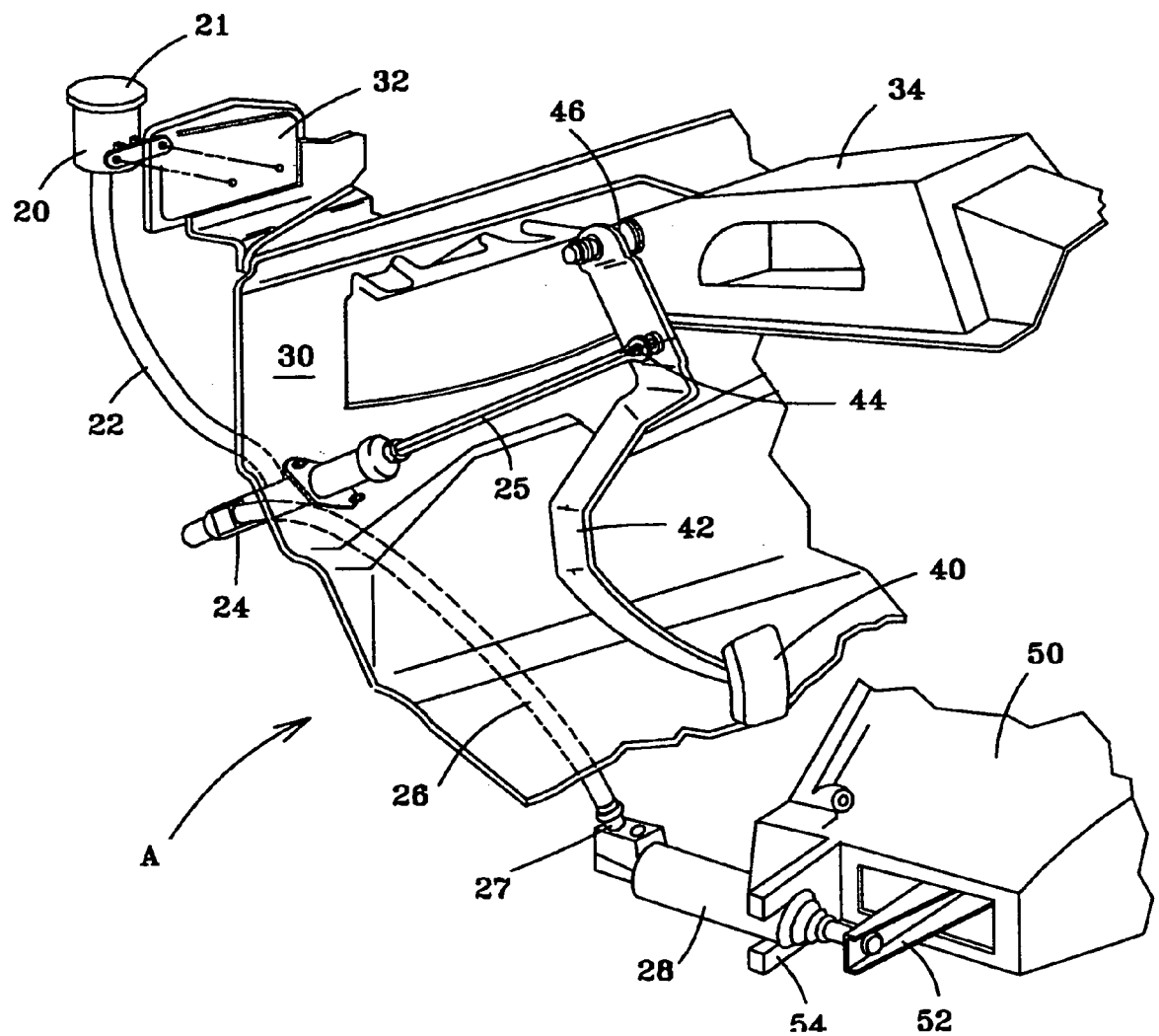
FIG. 1 is a perspective view of a typical clutch hydraulic control assembly operated by a clutch pedal and including an external slave cylinder.
Figure 2:
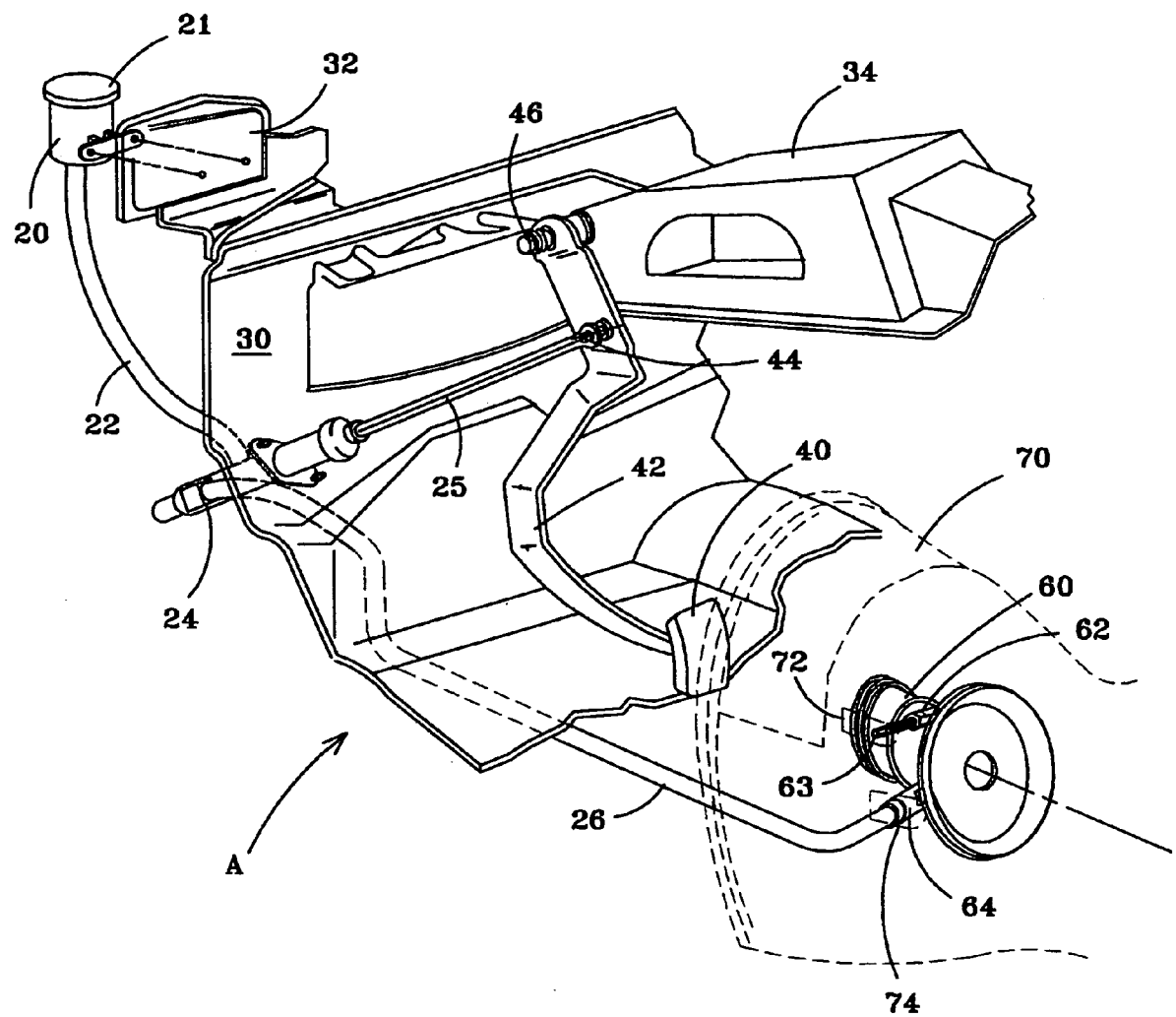
FIG. 2 is a perspective view of a typical clutch hydraulic control assembly operated by a clutch pedal and including a concentric slave cylinder.

Referring to the figures, the embodiments of the invention will be described in more detail. Both FIG. 1 and FIG. 2 illustrate a typical clutch hydraulic control assembly A for operating a clutch in a vehicle transmission housing 50 or 70. These illustrations are similar to that of the "Ford Ranger & Bronco II Automotive Repair Manual" published by Haynes North America, Inc. of Newbury Park, Calif. for models 1983 through 1992. The typical clutch hydraulic control assembly includes a hydraulic fluid reservoir 20 having a factory cap 21. The reservoir is generally attached to a reservoir support 32 of a firewall 30 of the vehicle. The fluid reservoir may contain a diaphragm inside the cylindrical reservoir as an interface between the air at the top of the reservoir and the hydraulic fluid. The objective is to keep air out of the hydraulic fluid of the control assembly. The clutch hydraulic control assembly further includes an upper hydraulic line 22 extending from the hydraulic fluid reservoir to a master cylinder 24. The hydraulic fluid reservoir and the upper hydraulic line keep the master cylinder supplied with hydraulic fluid. A clutch pedal 40 is depressed by an operator to rotate a clutch arm 42 about a clutch pivot 46 to move a master cylinder shaft 25, connected to the clutch arm by a bushing connector 44, to operate the master cylinder. This operation forces hydraulic fluid from the master cylinder to a slave cylinder through a lower hydraulic line 26.

The slave cylinder illustrated in FIG. 1 is an external slave cylinder 28 carried by a cylinder support 54 from transmission housing 50. The external slave cylinder is operated to move a clutch arm 52 which engages or disengages the clutch within the transmission housing. A port connection 27 provides the connecting interface between lower hydraulic line 26 and external slave cylinder 28. Bleeding of this clutch hydraulic control assembly is realized by removing the lower hydraulic line from the external slave cylinder at the port connection. The external slave cylinder is then removed and filled with hydraulic fluid while making sure no air is contained in the hydraulic fluid. Bleeding from the upper hydraulic line, the master cylinder and the lower hydraulic line occurs at the port connection as described later in this description.

The slave cylinder of FIG. 2 is a concentric slave cylinder 60 carried within a transmission bell housing 70 inline with the transmission power train. Access to the concentric slave cylinder is through a hydraulic line aperture 74 and a bleeder valve aperture 72. The lower hydraulic line is connected to the concentric slave cylinder by a hydraulic line coupler 64 through the hydraulic line aperture. A bleeder valve 62 with a bleeder screw 63 of the concentric slave cylinder allow the clutch hydraulic control assembly to be bled of air without removing lower hydraulic line 26 from concentric slave cylinder 60. Bleeding of clutch hydraulic control assembly A can occur directly through the bleeder valve, as discussed later in this description.

Figure 3:
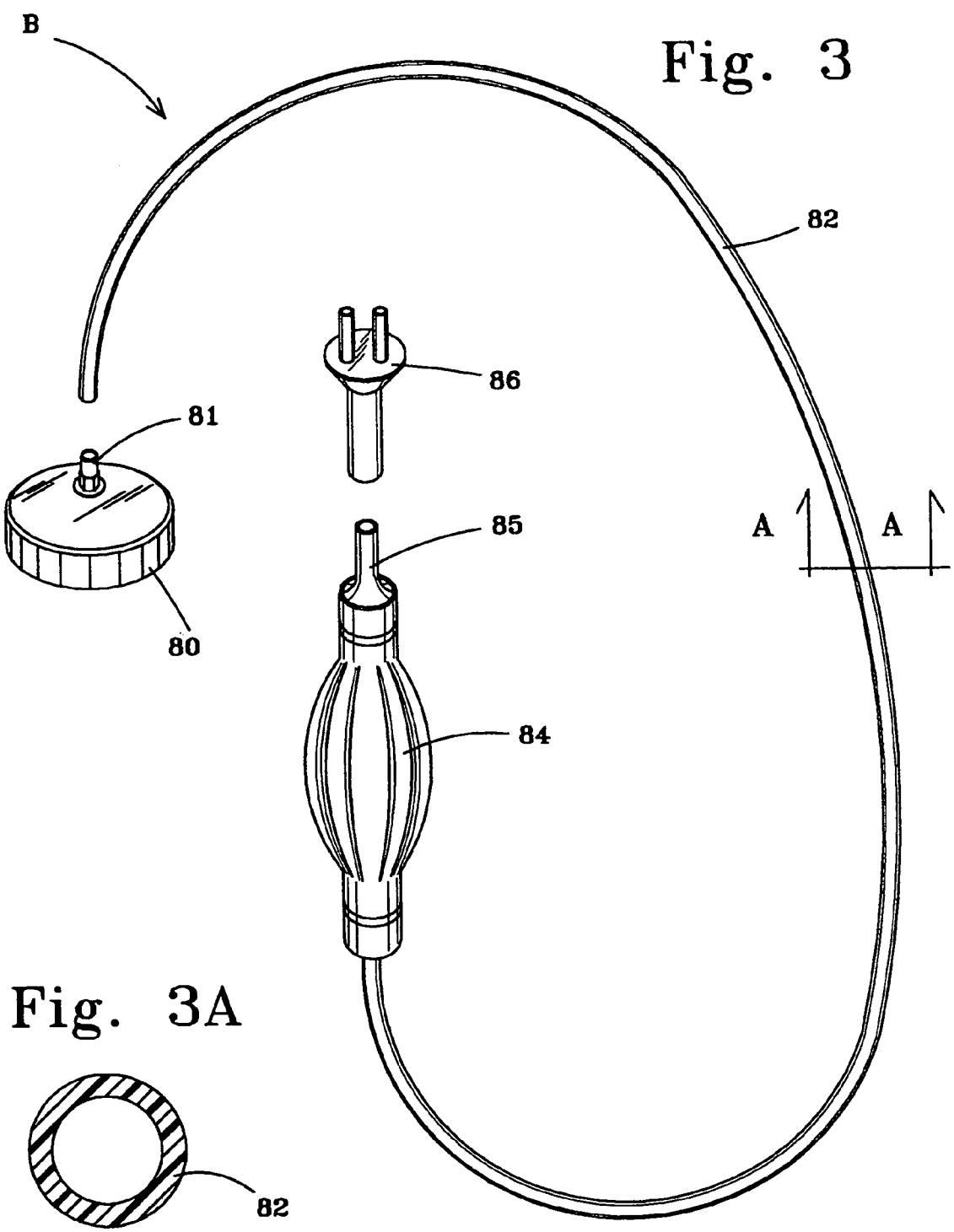
FIG. 3 is an exploded perspective view of the clutch bleeder tool assembly of this invention showing the main components separated.

Components of the clutch bleeder tool assembly are illustrated in the exploded view of FIG. 3. The bleeder tool has four essential components. An adaptor cap 80 is used to replace the factory cap of the clutch hydraulic control assembly. A hose 82 is connected at one end to a hose connector 81 on the top of the adaptor cap. The hose has a standard cross-sectional shape as illustrated in FIG. 3A and is made of a rubber or plastic material. Other materials can also be used to transmit air through the tool assembly. The other end of the hose is connected to a bulb pump 84. The bulb pump is configured as a bellows so that air is ejected from both ends when the bellows is collapsed and released by hand. Typical bulb pumps are known in the industry. The bulb pump can be made of a rubber or plastic material. Preferably the bulb pump is made of rubber which is resistant to the hydraulic fluid that may enter the clutch bleeder tool assembly. A check valve 86 is placed at the free end of the bulb pump to allow air to enter the bellows when the bulb pump is expanding and keeps air from being expelled from the free end when the bellows is collapsed. A typical check valve (U.S. Pat. No. 3,194,268) is manufactured by Trico Mfg. Corp. of Pewaukee Wis. Therefore, the bulb pump becomes an air pump forcing air toward the adaptor cap through the hose. The bulb pump can also be made with a check valve built into the bulb pump itself, within the scope of this invention. For example, the bulb pump used by medical personnel to check the blood pressure of a patient usually has an integral check valve. The clutch bleeder tool components are assembled together to form the clutch bleeder tool assembly to use with the clutch hydraulic control assembly as described in the sections which follow.

Figure 4:
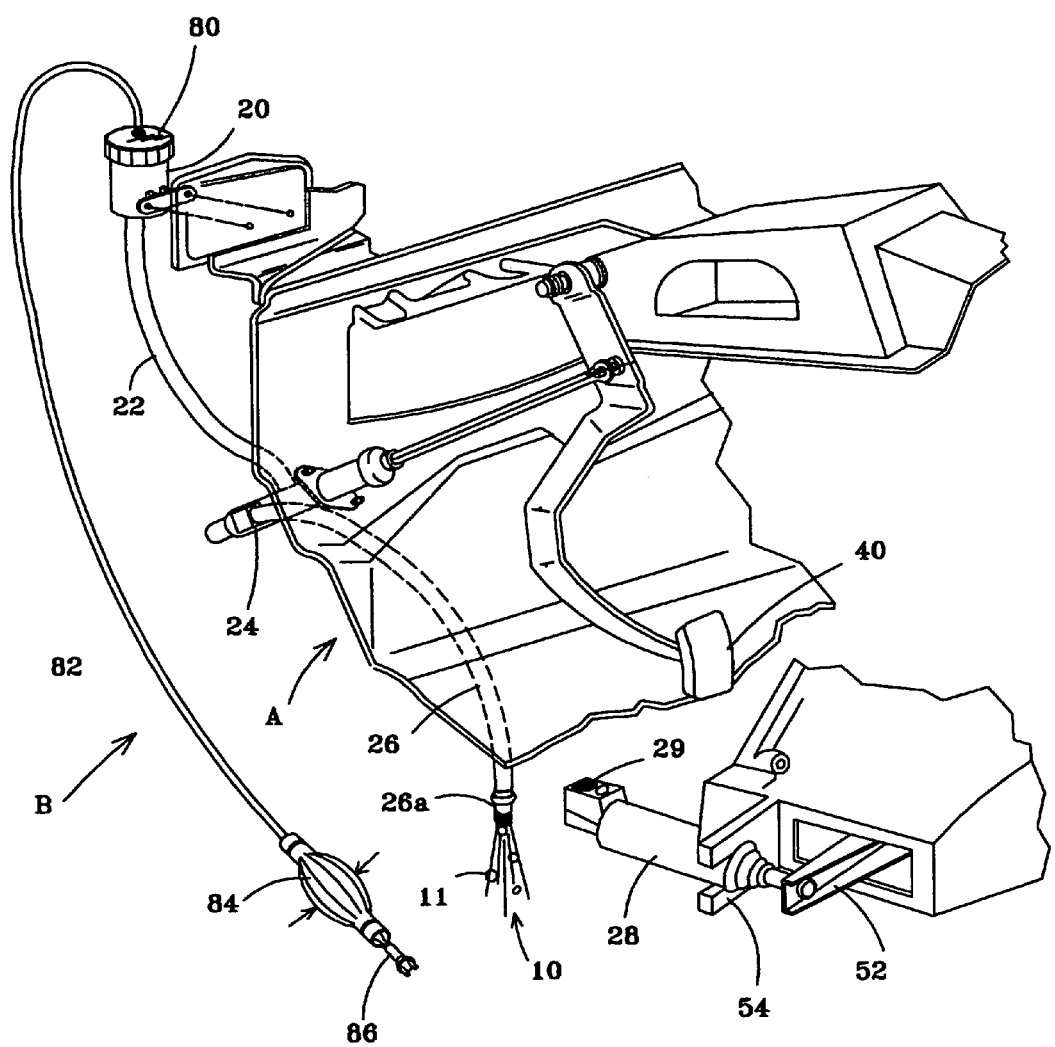
FIG. 4 is a perspective view of the clutch bleeder tool assembly being used on the clutch hydraulic control assembly having an external slave cylinder to purge the clutch hydraulic control assembly of air.
Figure 5:
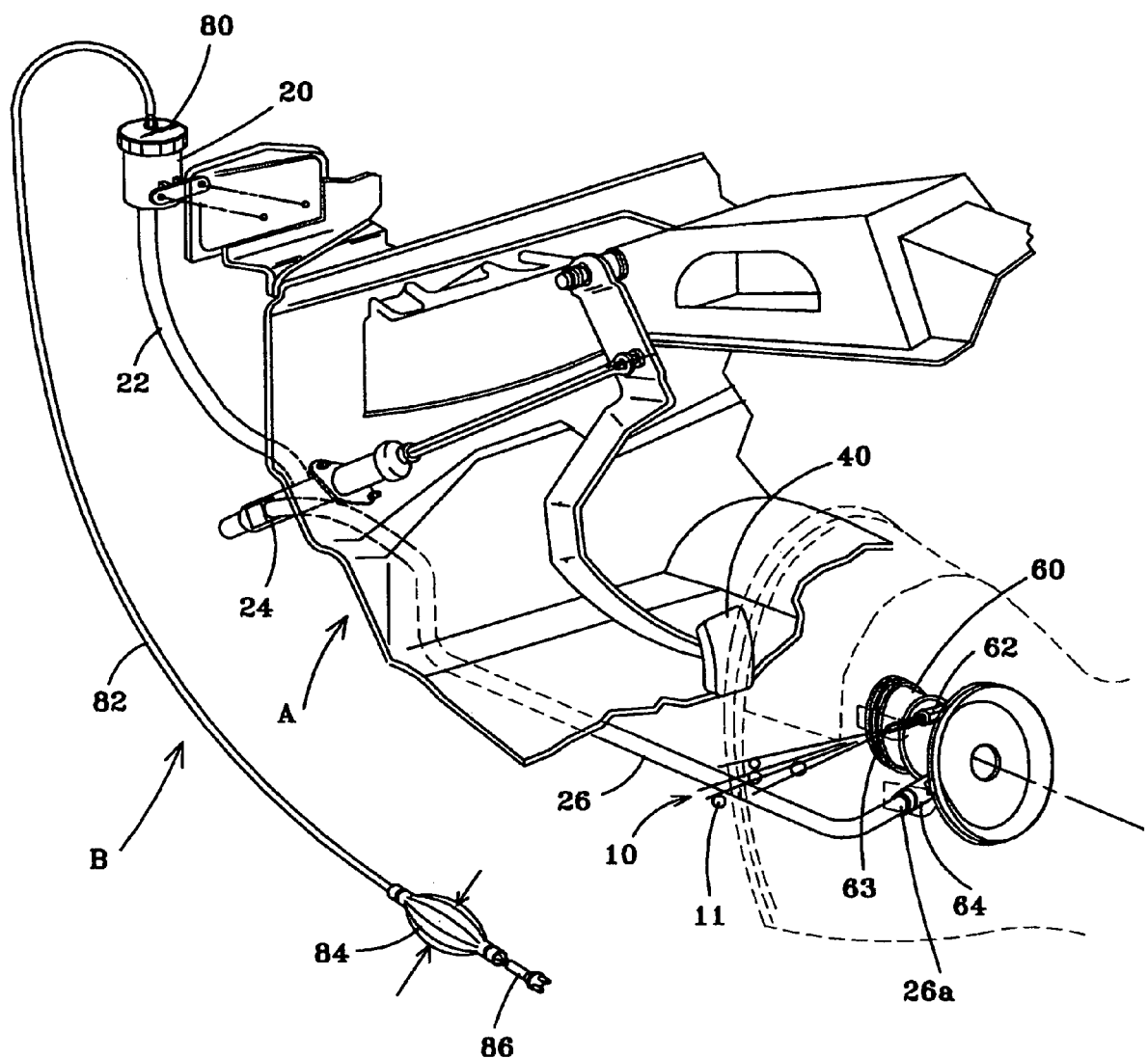
FIG. 5 is a perspective view of the clutch bleeder tool assembly being used on the clutch hydraulic control assembly having a concentric slave cylinder to purge the clutch hydraulic control assembly of air.

Clutch bleeder tool assembly "B" is used in combination with clutch hydraulic control assembly "A" as illustrated in FIGS. 4 and 5. The factory cap and diaphragm of hydraulic fluid reservoir 20 of the control assembly is removed and the reservoir is filled to a level near the top of the reservoir. Preferably the reservoir is filled to about 0.5 inches from the top of the reservoir. Adaptor cap 80 of the tool assembly replaces factory cap 21 of the control assembly, as illustrated. Hose 82 is attached to the adaptor cap at one end and is extended downward so bulb pump 84 with check valve 86 at the other end of the hose is located near the slave cylinder. This location of the bulb pump allows one mechanic to perform the bleeding of the control assembly.

The method of bleeding the clutch hydraulic control assembly is somewhat different depending on the type of slave cylinder used with the clutch hydraulic control assembly. The use of external slave cylinder 28 is illustrated in FIG. 4. With this aspect of the invention, lower end 26a of lower hydraulic line 26 must be removed from the external slave cylinder at connector port 29 before the external slave cylinder can be filled with hydraulic fluid and purged of any air bubbles. The external slave cylinder is purged of air bubbles by filling the external slave cylinder and pushing on the shaft of the filled external slave cylinder to expel any air. While the external slave cylinder is being filled, the lower end of the lower hydraulic line must be plugged or capped to stop the hydraulic fluid from escaping from the remaining control assembly.

The remaining clutch hydraulic control assembly leading to external slave cylinder 28 is purged of air bubbles by operating bulb pump 80 by hand after unplugging the lower end of the lower hydraulic line. The remaining control assembly includes upper hydraulic line 22, master cylinder 24 and lower hydraulic line 26. Purging of air is realized by pumping the bulb pump of the bleeder tool assembly about three times to pressurize the remaining control assembly. The air pressure generated by the clutch bleeder tool assembly is used to force air bubbles from the remaining control assembly without pumping the clutch pedal. This method makes it possible to have only one mechanic bleeding the control assembly. Air is forced into the hydraulic fluid reservoir when bulb pump 84 is collapsed by the forces applied as indicated by the arrows. After repeated pumping of the bulb pump, hydraulic fluid 10 flowing from the lower end of the lower hydraulic line will be free of bubbles 11. The hydraulic fluid reservoir must not be drained during the bleeding operation and must be checked from time to time and filled, if necessary. The lower end of the lower hydraulic line must be plugged with each pause in the bleeding operation. Once hydraulic fluid 10 is free of bubbles 11, the lower end of lower hydraulic line is reconnected to the external slave cylinder, the adaptor cap is removed, the hydraulic fluid reservoir is filled with hydraulic fluid and the factor cap and diaphragm are reinstalled. A final checking of the total control assembly is provided by pumping the clutch pedal and observing proper action of the control assembly. If the control assembly has a sluggish response, the mechanic should start over by again removing the lower hydraulic line from the external slave cylinder at the connector port and repeating the bleeding operation.

The use of concentric slave cylinder 60 is illustrated in FIG. 5. This configuration is generally associated with later model vehicle transmissions. With this aspect of the invention, lower end 26a of lower hydraulic line 26 is connected directly to a hydraulic line coupler 64 extending from concentric slave cylinder 60. The concentric slave cylinder includes a bleeder valve 62 with a bleeder screw 63 at an outer end of the bleeder valve. The concentric slave cylinder is purged of air bubbles by opening the bleeder screw and forcing hydraulic fluid from the hydraulic fluid reservoir through upper hydraulic line 22, master cylinder 24 and lower hydraulic line 26 into the concentric slave cylinder. Therefore, total clutch hydraulic control assembly A is purged of trapped air bubbles 11 at the same time.

Purging air bubbles from the clutch hydraulic control assembly having a concentric slave cylinder is again realized by pumping the bulb pump of the bleeder tool assembly about three times to pressurize the control assembly. The air pressure generated by the clutch bleeder tool assembly is used to force air bubbles from the control assembly without pumping the clutch pedal. This method makes it possible to have only one mechanic bleeding the control assembly. Air is forced into the hydraulic fluid reservoir when bulb pump 84 is collapsed by the forces applied as indicated by the arrows. After repeated pumping of the bulb pump, the pumping can stop when hydraulic fluid flowing from the bleeder valve from the concentric slave cylinder will be free of bubbles. That is, when the flow of hydraulic fluid 10 from bleeder valve 62 is free of bubbles 11, bleeder screw 63 of bleeder valve 62 is closed. During normal operation of the bulb pump, about three pumps usually develops enough pressure in the hydraulic fluid reservoir to complete the bleeding operation. Pressures should be maintained between about 2.0 pounds per square inch and about 5.0 pounds per square inch depending on the particular assembly being purged of air.

The hydraulic fluid reservoir must not be drained during the bleeding operation and must be checked from time to time and filled, if necessary. Once hydraulic fluid 10 is free of bubbles 11, adaptor cap 80 is removed hydraulic fluid reservoir 20 is filled with hydraulic fluid 10 and factor cap 21 and diaphragm (not shown) are reinstalled. A final checking of the total control assembly is provided by pumping the clutch pedal and observing proper action of the control assembly. If the control assembly has a sluggish response or incomplete travel, the mechanic should start over by again opening the bleeder screw and repeating the bleeding operation.

While a preferred embodiment of the invention has been described using specific terms and a particular prior art reference, such description is for illustrative purposes only, and it is to be understood that changes and variations may be made without departing from the spirit or scope of the following claims.

What is claimed is:

1. A method for bleeding air from a clutch hydraulic control assembly of a vehicle transmission having a hydraulic fluid reservoir with a factory cap and a diaphragm, an upper hydraulic line, a lower hydraulic line with a lower end, a master cylinder and a slave cylinder, said method including the steps of;
   a) repairing any leaks in the clutch hydraulic control assembly;
   b) removing the factory cap and diaphragm from the hydraulic fluid reservoir;
   c) filling the upper and lower hydraulic lines, the master cylinder and the slave cylinder with a hydraulic fluid, if necessary;
   d) filling the hydraulic fluid reservoir with the hydraulic fluid to about 0.5 inch from the top;
   e) providing a clutch bleeder tool assembly including an air hose connected at one end to an adaptor cap and at the other end to a bulb pump with a check valve;
   f) connecting said bleeder tool assembly to the clutch hydraulic control assembly by firmly installing said adaptor cap on the hydraulic fluid reservoir;
   g) preparing the clutch hydraulic control assembly to receive the hydraulic fluid;
   h) pumping said bulb pump on said bleeder tool assembly about three times to pressurize the clutch hydraulic control assembly for purging air from the clutch hydraulic control assembly;
   i) removing said adaptor cap from the hydraulic fluid reservoir and refilling the hydraulic fluid reservoir to the top;
   j) repeating steps h) and i) until all air is purged from the clutch hydraulic control assembly;
   k) replacing the adaptor cap with the factory cap on the hydraulic fluid reservoir; and
   l) checking the clutch hydraulic control assembly for proper operation and returning to step f), if necessary.

2. The method of claim 1 wherein the slave cylinder is an external slave cylinder and wherein the third step of filling the slave cylinder with the hydraulic fluid includes the steps of:
   a) removing the external slave cylinder from the vehicle transmission and detaching the lower hydraulic line from the external slave cylinder;
   b) plugging the lower end of the lower hydraulic line to prevent hydraulic fluid loss from the lower hydraulic line;
   c) holding the external slave cylinder so that the external slave cylinder can be filled with the hydraulic fluid; and
   d) pushing on the filled external slave cylinder to expel any air trapped in the external slave cylinder.

3. The method of claim 2 wherein the seventh step of preparing the clutch hydraulic control assembly to receive the hydraulic fluid includes the step of unplugging the lower end of the lower hydraulic line.

4. The method of claim 3 wherein the ninth step of removing the adaptor cap from the hydraulic fluid reservoir includes an initial step of capping the lower end of the lower hydraulic line to prevent hydraulic fluid from being discharged from the clutch hydraulic control assembly.

5. The method of claim 4 wherein the twelfth step of checking the clutch hydraulic control assembly for proper operation includes the step of reconnecting the lower hydraulic line to the external slave cylinder.

6. The method of claim 1 wherein the slave cylinder is a concentric slave cylinder with a bleeder valve and wherein the seventh step of preparing the clutch hydraulic control assembly includes opening the bleeder valve of the concentric slave cylinder.

7. The method of claim 6 wherein the ninth step of pumping said bulb pump and purging air from the clutch hydraulic control assembly includes a later step of closing the bleeder valve.

8. The method of claim 1 wherein the twelfth step of checking the clutch hydraulic control assembly includes the step of pumping the master cylinder several times and adding hydraulic fluid to the hydraulic reservoir, if necessary.

9. The method of claim 1 wherein the eleventh step of replacing the adaptor cap with the factory cap includes replacing the diaphram before the factory cap is installed.

10. The method of claim 1 including the step of locating the bulb pump near the slave cylinder so that one operator can completely bleed the air from the clutch hydraulic control assembly without assistance from another operator.

11. A clutch bleeder tool assembly used in combination with a clutch hydraulic control assembly of a clutch type vehicle transmission, said combination tool and control assemblies comprising:
- a hydraulic fluid reservoir of the control assembly attached to a firewall and having a factory cap and containing a hydraulic fluid for hydraulically operating the control assembly;
- a master cylinder of the control assembly operated by a clutch pedal and arm to receive and discharge said hydraulic fluid;
- an upper hydraulic line of the control assembly extending between and connected to said hydraulic fluid reservoir and said master cylinder to supply said master cylinder with hydraulic fluid;
- a slave cylinder of the control assembly for operating the clutch type vehicle transmission;
- a lower hydraulic line of the control assembly extending from and connected between said master cylinder and said slave cylinder so that supplying hydraulic fluid to and removing said hydraulic fluid from said slave cylinder occurs when said clutch pedal is depressed or relaxed respectively;
- an adaptor cap of the tool assembly having a hose connector, wherein said adaptor cap is used to replace said factory cap on said hydraulic fluid reservoir for bleeding the control assembly of air;
- a hand held bulb pump with a check valve of the tool assembly for pumping air in one direction through the bulb pump; and
- a hose of said tool assembly connected between said adaptor cap and said bulb pump, wherein said bulb pump is operated to pressurize the control assembly and purge any air bubbles from said clutch hydraulic control assembly.

12. The combination tool and control assembly of claim 11 wherein said slave cylinder is an external slave cylinder having a port connection and a connector port for receiving and connecting said lower hydraulic line to said slave cylinder, wherein said lower hydraulic line is removed from said external slave cylinder at said connector port for filling the external slave cylinder with hydraulic fluid and bleeding of the remaining control assembly when said bulb pump is operated.

13. The combination tool and control assemblies of claim 11 wherein said slave cylinder is a concentric slave cylinder having a bleeder valve and bleed screw, wherein said bleed screw is operated for bleeding the clutch hydraulic control assembly of air when said bulb pump is operated.

14. The combination tool and control assembly of claim 11 wherein the hand-held pump is operated to establish a pressure in the hydraulic fluid reservoir between about 2.0 (two) pounds per square inch and about 5.0 (five) pounds per square inch to force air bubbles from the clutch hydraulic control assembly without damaging the clutch hydraulic control assembly.

* * * * *